US012788005B2

(12) United States Patent
Kupumbati

(10) Patent No.: US 12,788,005 B2
(45) Date of Patent: Nov. 10, 2026

(54) ANIMAL TISSUE PRESERVATION AND STORAGE FOR MEDICAL USE

(71) Applicant: Tara Shivashankar Kupumbati, Irvine, CA (US)

(72) Inventor: Tara Shivashankar Kupumbati, Irvine, CA (US)

( * ) Notice: Subject to any disclaimer, the term of this patent is extended or adjusted under 35 U.S.C. 154(b) by 937 days.

(21) Appl. No.: 17/429,415

(22) PCT Filed: Jan. 15, 2020

(86) PCT No.: PCT/US2020/000004

§ 371 (c)(1),
(2) Date: Aug. 9, 2021

(87) PCT Pub. No.: WO2020/171890

PCT Pub. Date: Aug. 27, 2020

(65) Prior Publication Data

US 2022/0125041 A1 Apr. 28, 2022

Related U.S. Application Data

(60) Provisional application No. 62/807,682, filed on Feb. 19, 2019.

(51) Int. Cl.
*A01N 1/122* (2025.01)

(52) U.S. Cl.
CPC .................................... *A01N 1/122* (2025.01)

(58) Field of Classification Search
None
See application file for complete search history.

(56) References Cited

U.S. PATENT DOCUMENTS

2002/0177116 A1* 11/2002 Wiggins .................... C12N 1/04 435/1.1
2002/0192197 A1 12/2002 Kuri-Harcuch et al.
2014/0234434 A1* 8/2014 Paniagua ............ A61L 27/3625 424/569

FOREIGN PATENT DOCUMENTS

CN 106973888 A * 7/2017 ............. A01N 1/021
EP 0230672 A2 8/1987
WO 1996034910 A1 11/1996
WO WO-9634910 A1 * 11/1996 ............... A01N 1/02

OTHER PUBLICATIONS

Caron et al (Drug Discovery Today, vol. 25, No. 4, Apr. 2020, Doi: 10.1016/j.drudis.2020.01.012 ) (Year: 2020).*
International Search Report of PCT/US2020/000004, Mailed on Apr. 20, 2020.

* cited by examiner

*Primary Examiner* — Peter Paras, Jr.
*Assistant Examiner* — Khoa Nhat Tran
(74) *Attorney, Agent, or Firm* — NGUYEN TARBET IP LAW

(57) ABSTRACT

A method for treating tissue to form a dry tissue component that is readily rehydrated and does not require rinsing prior to implantation in the human body. The method comprises pretreatment and fixation steps that include penetrating agent molecules having a flexible backbone and at least one polar group; the steps further include cations and anions to enhance integration of penetration agent molecules into and bonding to tissue component structural molecules to provide resistance to cracking of the dry tissue component during bending.

11 Claims, 5 Drawing Sheets

ANIMAL TISSUE PRESERVATION AND STORAGE FOR MEDICAL USE

CROSS REFERENCE TO RELATED APPLICATIONS

This patent application makes reference to and thereby incorporates all information found in the provisional patent applications numbered: 62/807,682 entitled Animal Tissue Preservation for Medical Use filed 19 Feb. 2019 by Tara S. Kupumbati, and also makes reference to an thereby incorporates all information found in PCT application numbered PCT/US2020/000004 entitled Animal Tissue Preservation for Medical Use filed 15 Jan. 2020 by Tara S. Kupumbati.

BACKGROUND OF THE INVENTION

Tissues taken from a variety of animal sources including human tissues have been used as tissue components in a variety of medical devices for implant into the human body. Such tissue components can be obtained from pericardial tissues, heart valve tissue, vascular tissue, or other tissues of an animal origin. Alternately a tissue component can be an engineered tissue formed from cellular growth in an incubator and formed into a tissue component comprised of structural molecules including collagen, elastin, lipids and other molecules found in the molecular matrix of a tissue component. The tissue component can be used, for example, as a heart valve leaflet, a vascular graft, a tissue patch, or used for other applications throughout the body where a replacement tissue such as a tissue component has application.

Often such tissue components are crosslinked in glutaraldehyde, for example, to reduce immune response that the body might have with the tissue component that could lead to rejection of the tissue component and potential cellular and enzymatic degradation of the tissue component within the body. Following glutaraldehyde crosslinking the tissue component is often packaged as a wet tissue component in an aqueous preservative. The tissue component is transported as a wet tissue component to the hospital and awaiting implant into the body of a patient. The physician and operating room staff are then required to rinse the aqueous preservative solution from the wet tissue component for an extended period of time with saline to ensure that all preservative solution has been removed from the tissue component prior to implantation.

Much development activity has been applied to the overall treatment of the tissue component in an effort to remove the water from the crosslinked tissue component such that the tissue component can be packaged and transported as a dry tissue component thereby eliminating the lost time associated with rinsing the preservative solution from the tissue component. The dry tissue component can then be rehydrated by the physician in the operating room and implanted directly into the patient. Such dry tissue components have been subject to increased cracking and tissue failure due to the brittle nature of the dry tissue component using current treatment methods; additionally, such dry tissue components are very slow to rehydrate in the operating room. What is needed is a treatment method for a tissue component that allows the tissue component to be packaged and transported as a dry tissue component, retains its flexibility to avoid cracking, and allows the physician to rehydrate the tissue component readily for direct implant without the need for rinsing a preservative solution out of the tissue component.

SUMMARY

The present invention is a tissue treatment system and method for treating a tissue component such that it can be packaged and transported to the hospital as a dry tissue component that is flexible and does not form cracks that can weaken the structure and result in failure of the tissue component. The treatment method comprises three steps, pretreatment, fixation, and drying. Each step contributes in forming a flexible dry tissue component.

The tissue component can be formed from a xenographic or homographic pericardial tissue, heart valve tissue, vascular conduit tissue or other tissue taken from a living animal including porcine tissue, bovine tissue, equine tissue, human cadaver tissue or other tissues that have been used for implantation within the body. Also, the tissue component can be an engineered tissue grown from cells in an incubator whereby such cells generate collagen, elastin, lipids, and other molecules found in tissues of animals and humans. The tissue component can be used to form leaflets for heart valves, vascular grafts, patches for covering openings in the body, for example, and for other purposes where a tissue component may be needed within the body.

The pretreatment step of the method of the present invention involves forming an aqueous pretreatment solution and using the pretreatment solution as a pretreatment step for the tissue component. The pretreatment solution is comprised of a penetrating agent and counterions. The counterions can be both cations or anions that are added to the pretreatment solution. The penetrating agent consists of molecules that have a flexible backbone wherein each penetrating agent molecule has at least one polar group or polar moiety attached to the backbone that is able to form an attractive force with a positive or negative ion; the polar moiety can be a functional group having a positive or negative charge or a molecule with a dipole that is able to attract a positive or negative ion. The penetrating agent includes molecules such as glycerol, polyethylene glycol, fatty acids, vitamins, sugars, and other molecules of similar structure. Counterions of both positive and negative charge are added to the pretreatment solution; such counterions include sodium ions ($Na^+$), calcium ions ($Ca^{++}$), potassium ions ($K^+$), ferric ions ($Fe^{+++}$), ferrous ions ($Fe^{++}$); chloride ions ($Cl^-$), hydroxyl ions ($OH^-$), sulphate ions ($SO4^{--}$), phosphate ions ($PO4^{--}$), and other ions commonly found in human body. Counterions are positive and negative ions that dissociate in aqueous solution and position themselves adjacent to polar groups or charged groups found on collagen molecules, lipid molecules, elastin molecules, or other molecules found in the tissue component. The counterions assist in allowing the penetrating agent to penetrate into the intermolecular interstices of the tissue component by providing attractive forces between the polar groups of the penetrating agent and charged or polar groups found on structural molecules including collagen, elastin, and lipid molecules found in the molecular structure of the tissue component. The counterions, such as sodium and hydroxide, for example, can assist in converting a hydrophobic carboxylic acid to react and form a water-soluble salt; this water-soluble salt can then penetrate into the molecular structure of the tissue component and can be held via attractive forces to a polar group of a collagen molecule, for example.

The pretreatment step is initiated by placing the tissue component into the pretreatment solution which allows the flexible penetrating agent to integrate into the molecular structure of the tissue component, and places the penetrating agent molecule adjacent to the collagen molecule and other structural molecules of the tissue component so that subsequent exposure to a crosslinking agent molecule will create chemical bonds, including covalent bonds, between these molecules. The location of the penetrating agent molecule between respective neighboring collagen molecules provides the molecular structure of the tissue component with enhanced flexibility due to the flexible moiety associated with the penetrating agent molecule.

The invention further comprises the formation of a fixation solution and using the fixation solution as a fixation step to crosslink molecules originally found in the native tissue component and molecules that have diffused into the molecular structure of the tissue component from the pretreatment solution and from the fixation solution. The fixation solution is comprised of a crosslinking agent, counterions, and a penetrating agent. The crosslinking agent can be glutaraldehyde, formaldehyde, other aldehydes, or a combination of various aldehydes along with other molecules able to react and form a chemical bond between molecules found within the tissue component and molecules found in the fixation solution. The presence of counterions and penetrating agent molecules in the fixation solution allows the crosslinking agent molecules to integrate to a greater extent into the molecular structure of the tissue component and prevent the counterions and penetrating agent molecules that have integrated into the molecular structure of the tissue component from the pretreatment solution from diffusion out of the tissue component.

The counterions can convert a nonaqueous fatty acid, for example, into an water-soluble salt that can penetrate into the molecular structure of the tissue component and be held into close proximity with a structural molecule such as a collagen molecule, for example, via ionic attractive forces and undergo crosslinking to the collagen molecule via the crosslinking agent. The presence of penetrating agent molecules in the fixation solution further enhances the retention of flexible penetrating agent molecules at a location between two existing structural molecules such as collagen molecules, within the tissue component, for example. The presence of the counterions and the penetrating agent molecules in the fixation solution prevents of both counterions and penetrating agent molecules that have been integrated into the molecular structure of the tissue component (from pretreatment solution) from diffusing out of the tissue component and toward the fixation solution.

The fixation step is performed by taking the tissue component from its initial location within the pretreatment solution and placing it into the fixation solution to cause crosslinking to occur between structural molecules such as collagen molecules, for example, of the tissue component and between structural molecules and penetrating agent molecules. The tissue component is not rinsed following the pretreatment step and prior to the fixation step such that penetrating agent molecules and lipid molecules found in the tissue component are retained and subsequently crosslinked into the molecular structure of the tissue component via a crosslinking agent. In addition, lipid and elastin molecules found in the molecular structure of the tissue component are also crosslinked to each other, to other structural molecules, and also to the penetrating agent molecules. The presence of the penetrating agent molecules with their flexible backbone chain integrated between and crosslinked with respective or neighboring structural molecules such as collagen molecules, for example, of the tissue component causes the intermolecular distance between structural molecules, for example, to increase from the native state to that found during either the pretreatment or fixation steps and provides improved flexibility to the tissue component and an ability for the tissue component to bend without cracking; this flexibility is retained during subsequent treatment steps.

The invention further comprises the formation of a drying solution and use of the drying solution to form a dry tissue component that can be stored and transported as a dry tissue component. The drying solution is comprised of a hygroscopic agent, counterions, and penetrating agent. The hygroscopic agent can be isopropyl alcohol, ethanol, propanol, acetone, other polyhydric alcohol, or other molecule that is currently used to absorb one or more water molecules from a solution and can be removed via air drying or lyophilization. The penetrating agent can include polyethylene glycol, glycerol, or other molecule that has a flexible backbone and contains at least one polar group. The counterions which include both positive and negative ions as previously described in this specification assist in allowing the hygroscopic agent to integrate into the molecular structure of the tissue component and allow uniform removal of water from the tissue component. The counterions form attractive forces that assist in enhancing entry and stabilization of the hygroscopic agent as well as the penetrating agent into proximity with the molecules found in the tissue component. The presence of counterions and penetrating agent molecules in the drying solution also ensure that counterions and penetrating agent molecules that have penetrated into the tissue component during the pretreatment or fixation steps are not able to diffuse out of the tissue component toward the drying solution.

To initiate the drying step the tissue component is removed from the fixation solution and is placed into the drying solution that has been herein described. The penetrating agent molecules are held in place within the molecular structure of the tissue component via the crosslinking agent molecular bonds and via electrostatic attractive forces aided via the counterions. The intermolecular distance between respective molecules of the tissue component have been retained during this portion of the drying step due to the presence of counterions and penetrating agent molecules in the drying solution.

The drying step of the present invention further comprising removing the tissue component from the drying solution and placing it on a flat surface to allow air drying or drying via lyophilization forming a dry tissue component. During this portion of the drying step, the penetrating molecules are located between respective neighboring structural molecules such as collagen molecules, for example, located adjacent to each other, for example, of the tissue component. Other structural molecules such as lipids and elastin are also bonded to the penetrating agent molecules via the crosslinking agent and via ionic bonds formed with the counterions. The intermolecular distance between respective structural molecules such as collagen molecules, for example, located nearby each other within the molecular structure is increased due to the presence of the penetrating agent molecules to an intermolecular distance that is greater than that without the presence of the penetrating agent molecules and the counterions. The resultant dry tissue component is able to flex and bend without forming cracks that can weaken the tissue component and lead to failure of the tissue component. The presence of the counterions and polar moieties of the penetrating agent molecules found within the molecular structure of the dry tissue component enhances the ability of the dry tissue component of the present invention to be rehydrated more rapidly by the physician in the operating room that if such counterions and polar groups of the penetrating agent molecules were not present within the molecular structure.

DETAILED DESCRIPTION

Figure 1:
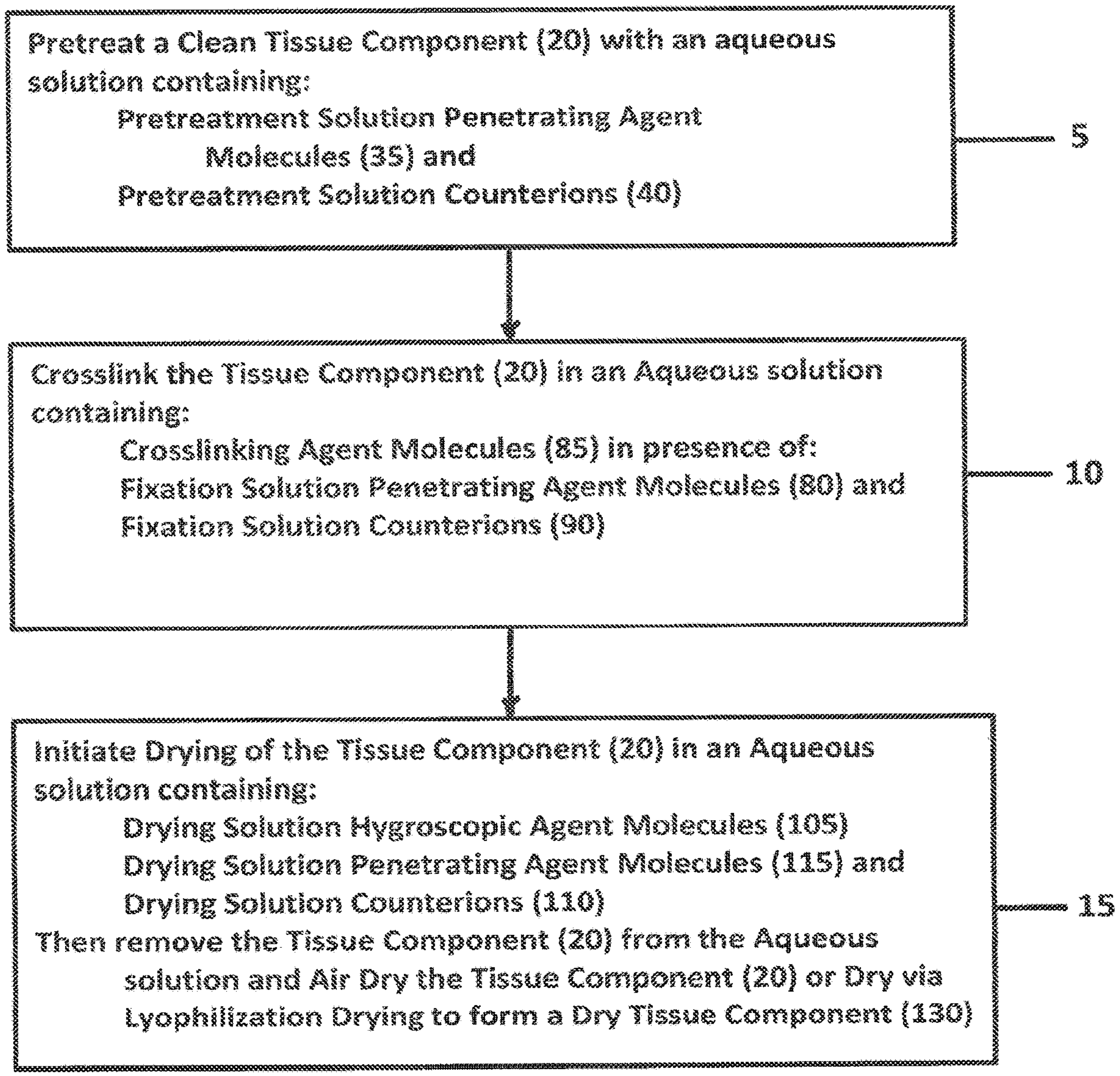
FIG. 1 is a process flow diagram showing the pretreatment step, fixation step, and the drying step along with the types of molecules and counterions found in the solutions used in each step.

FIGS. 1-5 show a process flow diagram and describe the three steps in the method of the present invention for treating a tissue component. The three steps as shown in FIG. 1 include pretreatment (5) in a solution containing penetrating agent, cations and anions (counterions); fixation (10) in a solution containing penetrating agent, fixation agent, cations, and anions; and drying (15) in a solution containing hygroscopic agent, penetrating agent, cations and anions followed by air drying or via lyophilization drying, for example. Cations or anions (i.e., charged groups or charged species) that are held near a charged group or polar group (or polar moiety) of a molecule having an opposing charge of the cation or anion are referred to as counterions or positive and negative ions. The tissue component can be obtained from xenographic sources, homographic sources, or from engineered tissue formed from cells grown in an incubator to generate structural molecules such as collagen, elastin, and lipid molecules, for example, similar to those found in tissues of the body. The tissue component formed from the present method can be used in a variety of medical applications including leaflets for heart valves, vascular grafts, patches used for attaching tissue, preventing leakage of fluids, and other applications. In the description found in this specification, a flat tissue component from a native tissue source will be described, however it is understood that the same process and method can be used to treat tissues obtained from other sources and tissue components of other shapes that can be tubular in shape, have a 3-D shape, or are formed into a tissue component that is used as a separate component of a medical device assembly, such as heart leaflets of a heart valve, for example.

Figure 2:
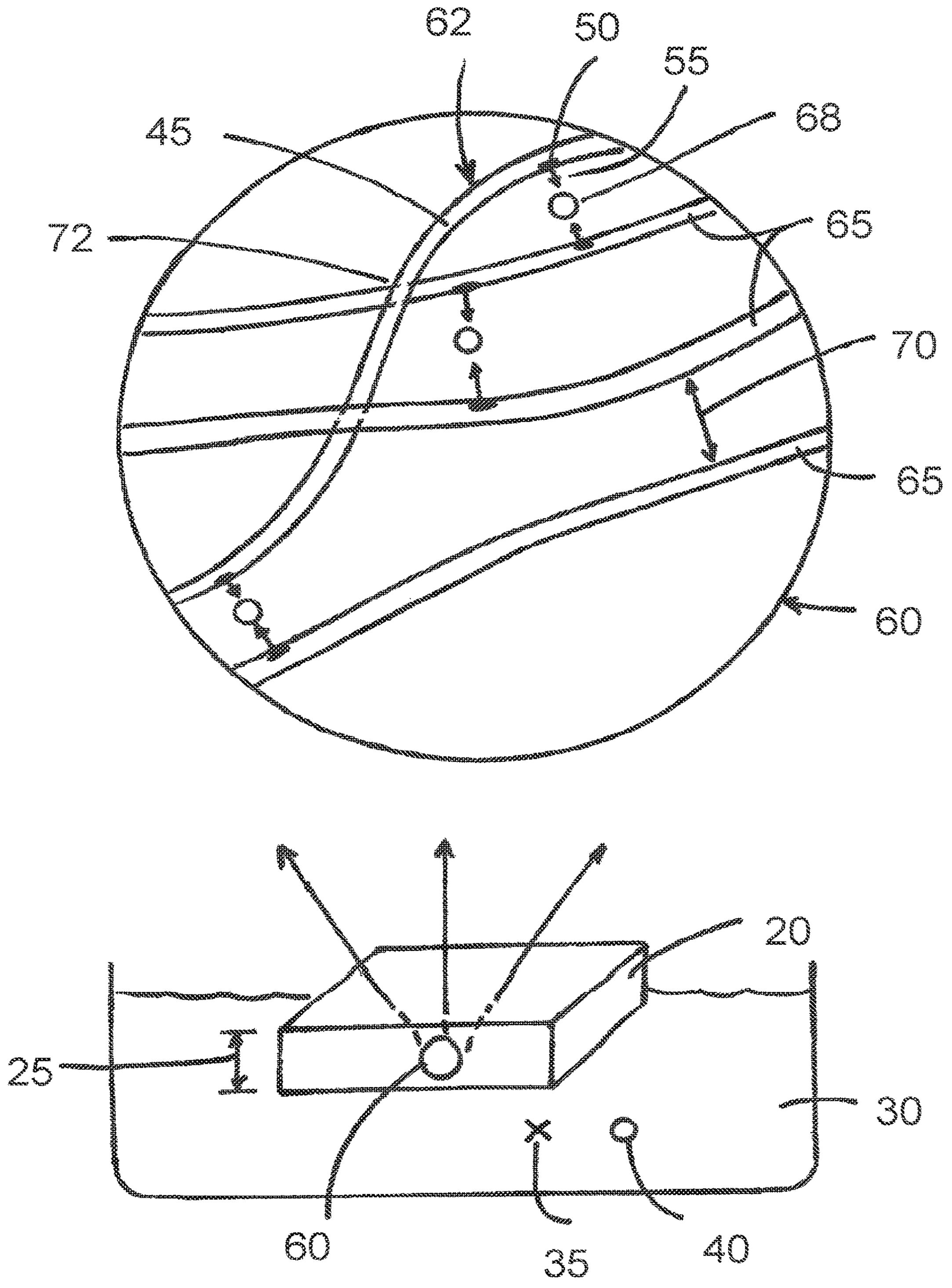
FIG. 2 is a view of the tissue component located in the pretreatment solution and a close-up view of the molecular structure of the tissue component with molecules of the pretreatment solution penetrating into the molecular structure.

The pretreatment step (5) comprises taking a clean fresh native tissue and forming a tissue component (20) with a tissue component thickness (25) as seen in FIG. 2. The tissue component thickness (25) is dependent upon several factors including the source of the tissue material and the application for which the tissue component is to be used. During the pretreatment step (5), the tissue component is placed into an aqueous pretreatment solution (30) containing a pretreatment solution penetrating agent (35) (i.e., penetrating agent molecules found in the pretreatment solution (30)) and a combination of cations and anions or pretreatment solution counterions (40) (i.e., counterions added to and thereby located in the pretreatment solution (30)). The pretreatment solution penetrating agent (35) can be a molecule having a flexible backbone (45) and at least one polar group or polar moiety (50) located along the chain able to form an attractive force (55) or polar attraction (55) with a positive or negative ion or counterion within the tissue component. The polar moiety (50) can be functional group located along the backbone of the penetrating agent molecule, for example, that has a dipole moment that is able to attract a positive or negative ion. The polar group or polar moiety (50) can form an ionic force or attractive force (55) by forming a salt that is attracted to a counterion of the opposite charge, for example. The pretreatment solution penetrating agent molecule (35) can be polyethylene glycol, glycerol, fatty acid, vitamins, sugars, polysaccharides, or other molecule with a flexible backbone (45) and at least one polar group (50) attached to the backbone. The cations and anions respectively include but are not limited to: sodium ions ($Na+$), calcium ions ($Ca++$), potassium ions ($K+$), ferric ions ($Fe+++$), ferrous ions ($Fe++$); chloride ions ($Cl-$), hydroxyl ions ($OH-$), sulphate ions ($SO4--$), and phosphate ions ($PO4--$).

The anions and cations assist in allowing the pretreatment solution penetrating agent molecules (35) to leave the pretreatment solution (30) and diffuse or migrate into the molecular structure (60) of the tissue component (20) as shown in FIG. 2 and become a penetrating agent molecule (62) located within the molecular structure of the tissue component (20). The counterions (68) (i.e., anions and cations) that have migrated into the molecular structure (60) of the tissue component (20) can form a carboxyl group of a non-water-soluble fatty acid, for example, into a soluble salt that can form an ionic bond with polar groups and charged groups extending from the backbone of a structural molecule (65) of the native tissue component (20) such as a collagen molecule, for example or other structural molecule (65) located in the molecular structure (60) of the tissue component (20). The pretreatment solution counterions (40) leave the pretreatment solution (30) and diffuse or migrate into the molecular structure (60) of the tissue component (20) to become (due to their location) counterions (68) of the tissue component (20). The counterions (i.e. cations and anions) assist both in increasing the penetration of the penetration agent molecule into the molecular structure (60) of the tissue component (20) but also help to hold the penetration agent molecule (62) within the molecular structure (60) via attractive forces (55) associated with the ionic charge of the counterion (68) (cation or anion) at a location within the molecular structure (60) adjacent to a structural molecule (65) such as a collagen molecule, for example, found in the tissue component (20). The counterions provide increased molecular contact (72) between the penetrating agent molecule and the structural molecule such that subsequent exposure of the tissue component to a crosslinking agent will result in an increased crosslinking between the penetrating agent molecule and the structural molecule.

Pretreatment (5) (i.e., the pretreatment step (5)) involves placing the tissue component (20) into the pretreatment solution (30) for a period of 10 hours (range 5 min-24 hours) to allow the penetrating agent molecule (62) to penetrate into the molecular structure (60) of the tissue component (20). The tissue component (20) has an initial tissue component thickness (25) that is dependent upon it application as a heart valve leaflet, for example, a patch, a vascular graft, or other application for the tissue component (20). The native tissue component thickness prior to pretreatment (5) can range from approximately 0.002 inches to 0.020 inches. The intermolecular distance (70) between structural molecules (65) such as collagen molecules, for example, found in the molecular structure (60) of the pretreated tissue component (20) is increased from the intermolecular distance (70) found in the native tissue component due to the presence of the penetrating agent molecules (62). The presence of the flexible penetrating agent molecule (62) located between separate and neighboring collagen molecules, for example, and held by ionic attractive forces (55) (or polar forces) provided by the counterions (68) that have diffused into the molecular structure and are located between the structural molecules of the tissue component. The counterions are derived from the pretreatment solution counterions (40) that are added as part of the present invention to the pretreatment solution (30) provides a flexibility to the tissue component (20); this flexibility will remain in place even after the tissue component (20) has been exposed to subsequent fixation (10) and drying steps (15). For the pretreatment solution (30) the lower limit for concentration for the pretreatment solution penetrating agent (35) of 100 millimolar (mM) is necessary to provide the required flexibility to the tissue component (20) to prevent cracking during bending of the final dry tissue component as described later. The lower limit for concentration of the pretreatment solution counterions (40) of 300 mM is required to provide the attractive forces (55) necessary to hold the penetrating agent molecules (62) within the molecular structure (60) to be subsequently crosslink bonded to structural molecules (65) of the tissue component (20). The molar ratio of pretreatment solution counterions (40) to pretreatment solution penetrating agent (35) in the pretreatment solution (30) is 3:1, for example; the present invention is not limited by a specific molar ratio.

The pretreatment solution (30) of the present invention can utilize one or more penetrating agents with a range of concentrations by weight of 1 to 95 percent. Also, the pretreatment solution (30) can incorporate one or more counterions with a concentration of 1-20 percent by weight. Examples of pretreatment solution (30) formulations that are included in the present invention are herein discussed; the pretreatment solutions examples are not intended to limit the scope of pretreatment solution options but rather provide specific formulations that have been tested and shown to produce treated dry tissue components that can be successfully dried and will retain flexibility without cracking during bending.

In Pretreatment Solution Example A (as herein described) the pretreatment solution (30) is formed from an aqueous solution with a pretreatment solution penetrating agent (35) at a concentration of 50% by weight (range 1-95%); the pretreatment solution penetrating agent (35) being polyethylene glycol. The pretreatment solution (30) contains a concentration of pretreatment solution anions and pretreatment solution cations (monovalent, divalent, or trivalent ions) of 10% by weight (range 1-20%).

Pretreatment Solution Example B has the pretreatment solution penetrating agent (35) being glycerol at a concentration of 50% by weight (range 1-95%). The pretreatment solution (30) contains a concentration of pretreatment solution anions and pretreatment solution cations (monovalent, divalent, or trivalent ions) of 10% by weight (range 1-20%).

In Pretreatment Solution Example C the pretreatment solution penetrating agent (35) is polyethylene glycol at a concentration of 50% by weight (range 1-95%) and glycerol at a concentration of 50% by weight (range 1-95%). The pretreatment solution (30) contains a concentration of pretreatment solution anions and pretreatment solution cations (monovalent, divalent, or trivalent ions) of 10% by weight (range 1-20%).

It is understood that the pretreatment solution (30) can be comprised of one or more penetrating agent molecules. Also, it is understood that separate penetrating molecules can be used in separate pretreatment steps (5) to form the pretreatment (5) of the tissue component (20). For example, one could apply the pretreatment step (5) as described for Pretreatment Solution Example A followed by Pretreatment Solution Example B to form a combination pretreatment step to pretreat the tissue component (20).

Figure 3:
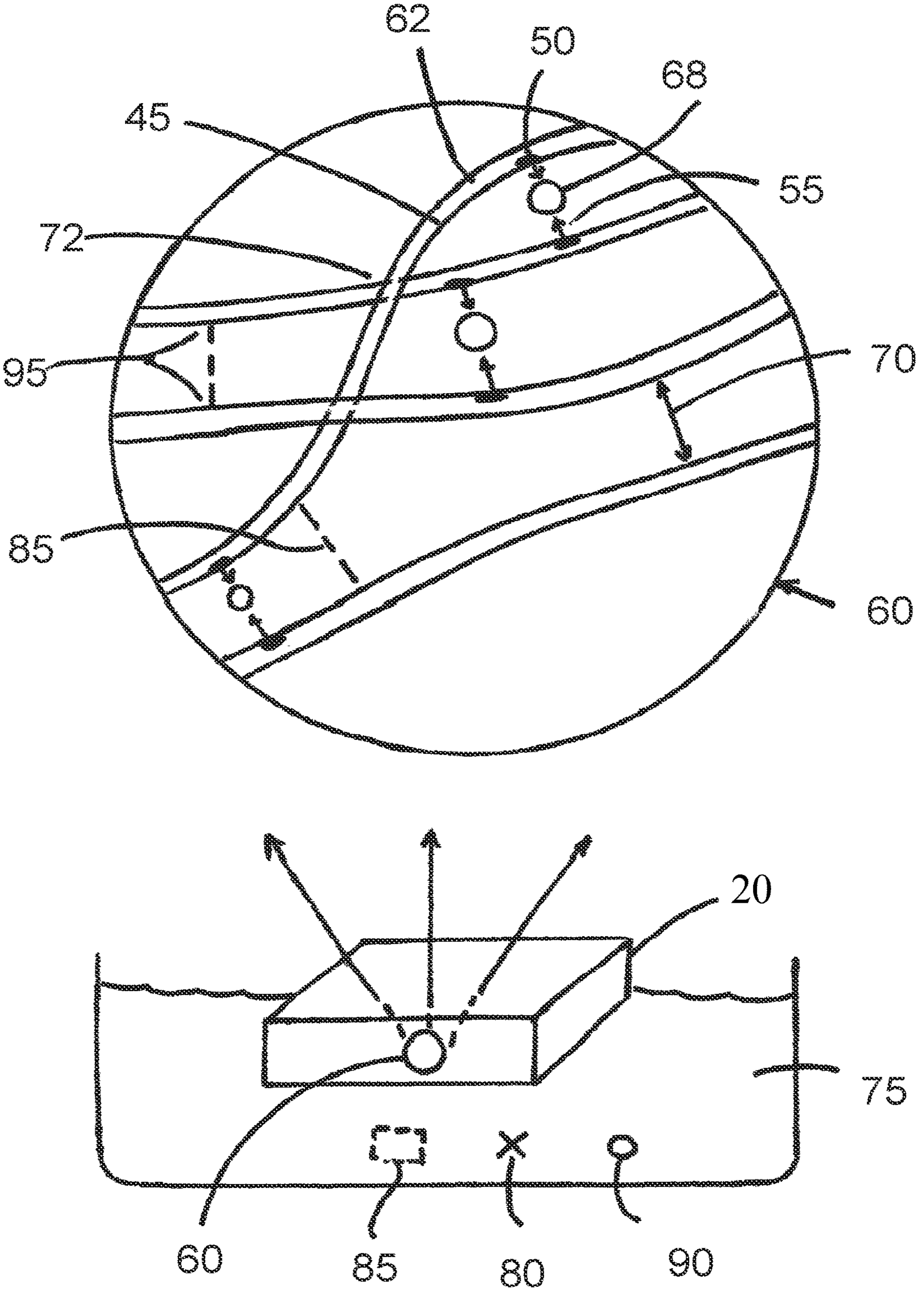
FIG. 3 is a view of the tissue component residing within the fixation solution and showing a close-up of the molecular structure of the tissue component with crosslinking between penetrating molecules and structural molecules of the tissue structure.
Figure 5:
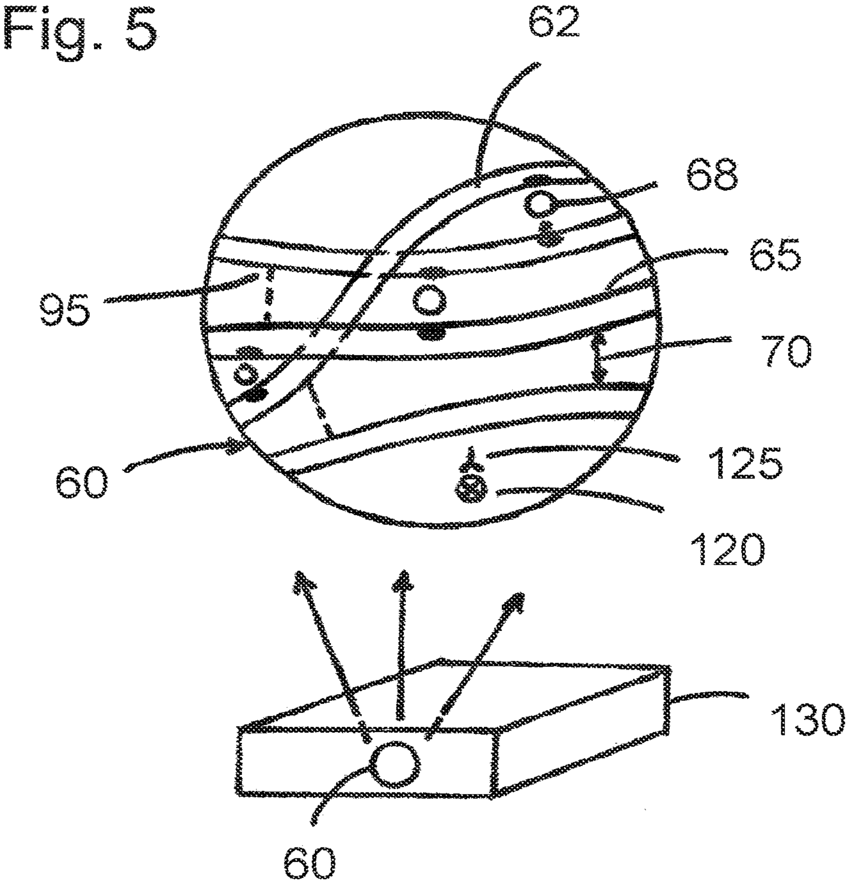
FIG. 5 is a close-up view of the molecular structure of a dry tissue component after significant water molecules have been removed via air drying or lyophilization drying; the molecular structure shows retention of penetrating agent molecules and counterions within the molecular structure.

The fixation step (10) (or fixation (10) of the tissue component) is initiated following the removal of the tissue component (20) from the pretreatment solution (30); fixation (10) is initiated by placing the tissue component (20) into an aqueous fixation solution (75) as shown in FIG. 3; the fixation solution contains fixation solution penetrating agent molecules (80) (i.e., penetrating agent molecules located in the fixation solution (75)), crosslinking agent molecules (85), and fixation counterions (90) (i.e., cations and anions in the fixation solution (75)). The tissue component (20) is not rinsed following the pretreatment step (5) such that the penetrating agent molecules (62) and lipid molecules of the tissue component (20) are retained within the molecular structure (60) of the tissue component (20). The penetrating agent molecules (62) along with the lipid molecules found in the tissue component (20) provide flexible molecules to the tissue component that will be retained within the molecular structure (60) and provide flexibility to the tissue component (20) even after the tissue component is dried to form a dry tissue component (130) as shown in FIG. 5.

The fixation solution penetrating agent molecules (80) include molecules with a flexible backbone chain (45) and at least one polar group (50) attached to the backbone chain including, for example, the pretreatment solution penetrating agent molecules (35) described previously as found in the pretreatment solution (30). The presence of fixation solution penetrating agent molecules (80) at an adequate minimum concentration within the fixation solution (75) is necessary to ensure that penetrating agent molecules (62) that have migrated into the tissue component (20) during the pretreatment step (5) are prevented from diffusing out of the tissue component (20) toward the fixation solution (75) during the fixation step (10).

The crosslinking agent molecules (85) include glutaraldehyde, formaldehyde, other aldehydes, and other crosslinking agents (85) currently used in forming crosslinking bonds (95) between structural molecules (65) including collagen, lipids, elastin and other molecules found in a native tissue component (20). Glutaraldehyde is often used as a crosslinking agent (85) due to its bifunctionality of two carbonyl groups that are able to bond chemically to amino groups found on the protein molecule of collagen. The glutaraldehyde molecule can also bond to other functional groups found on structural molecules (65) found in protein, lipids, and elastin including bonding to thiol, phenol, and imidazole groups.

As shown in FIG. 3, the crosslinking agent molecule (85) is able to penetrate into the interstices of the molecular structure (60) of the tissue component (20) and form crosslink bonds (95) to structural molecules (65) such as collagen molecules, lipid molecules, elastin molecules, and other long-chain molecules found in the tissue component (20). The crosslinking agent (85) creates a crosslinking bond (95) such as a covalent bond between the crosslinking agent molecule (85) and a structural molecule (65) such as a collagen molecule, for example, and also creates a crosslinking bond (95) with a neighboring structural molecule (65) thereby crosslinking neighboring structural molecules (65) to each other, for example. The crosslinking bond can be a covalent bond. Additionally, the crosslinking agent molecule (85) forms a crosslinking bond (95) with a penetrating agent molecule (62) that has been previously delivered to the molecular structure (60) of the tissue component (20) thereby crosslinking the penetrating agent molecule (62) with a neighboring penetrating agent molecule (62) or crosslinking the penetrating agent molecule (62) with a neighboring collagen molecule or other structural molecule of the tissue component (20). The presence of counterions within the molecular structure of the tissue component increases the molecular contact (72) between the penetrating agent molecule and the structural molecule of the tissue component thereby resulting in increased formation of crosslink bonds between these molecules upon exposure to a crosslinking agent than if said molecular contacts (72) had not been formed.

The presence of cations and anions in the fixation solution (75) (i.e., fixation solution counterions (90)) assist in providing attractive forces (55) that enhance the penetration of crosslinking agent molecules (85) and penetrating agent molecules (62) into the molecular structure (60) of the tissue component (20) and ensure that counterions (68) that have diffused into the tissue component (20) cannot diffuse out of the tissue component (20) and toward the fixation solution (75). The counterions (68) hold the pretreatment solution penetrating agent molecules (35) located within the molecular structure (60) of the tissue component (20) into close proximity with the structural molecules (65) of the tissue component (20) via attractive forces (55) to provide improved crosslinking between these molecules and the crosslinking agent molecule (85) than if there were not such pretreatment solution counterions (40) added to the pretreatment solution (30) and the fixation solution (75). The cations and anions can convert polar carboxyl group found on protein molecules of the tissue component into a salt that is water-soluble and hence provide improved integration of the crosslinking agent molecule (85) and penetrating agent molecule (62) into the molecular structure (60) of the tissue component (20).

During the fixation step (10), the tissue component (20) is placed into the fixation solution (75) for a period of 7 days (range 12 hours-30 days) to allow the crosslinking agent (85) to penetrate into the molecular structure (60) of the tissue component (20) and to effect a desired crosslinking between structural molecules (65) and penetrating agent molecules (62) located within the molecular structure (60) of the tissue component (20). The penetrating agent molecules have been positioned between and into contact with structural molecules of the tissue component and are held in place by attractive forces provided by the counterions prior to exposure to the crosslinking agent molecules. The intermolecular distance (70) between structural molecules (65) such as collagen molecules, for example, found in the tissue component (20) is increased from the intermolecular distance found in the native state due to the presence of the penetrating agent molecule (62) located within the molecular structure (60) of the tissue component (20). The presence of the flexible backbone (45) of the penetrating agent molecule (62) located between separate structural molecules (65), for example, and held by ionic attractive forces (55) of the polar groups (50) and crosslinked by the crosslinking agent molecule (85) to the structural molecules (65) provides a flexibility to the tissue component (20) that will remain in place even after the tissue component (20) has been exposed to the later drying step (15).

For the fixation solutions (75) the lower limit for concentration for the fixation solution penetrating agent (80) is 100 millimolar (mM) to ensure that penetrating agent molecules (62) located within the molecular structure (60) of the tissue component (20) cannot diffuse out towards the fixation solution (75). The lower limit for concentration of the fixation solution counterions (90) is 300 mM to prevent counterions (68) located within the molecular structure (60) of the tissue component (20) from diffusion out of the tissue component (20) towards the fixation solution (75). The molar ratio of fixation solution counterions (90) to fixation solution penetrating agent (80) in the fixation solution (75) is approximately 3:1, for example, although the present invention is not limited by a specific ratio of counterions to penetrating agent molecules.

The fixation solution (75) of the present invention can utilize one or more penetrating agents with a range of concentrations by weight of 1 to 85 percent. Also, the fixation solution (75) can incorporate one or more counterions with a concentration of 1-20 percent by weight. The fixation solution (75) can utilize one or more crosslinking agent molecules (85) at a concentration of 0.1-10 percent by weight. Examples of fixation solution (75) formulations that are included in the present invention are herein discussed; the fixation solutions examples are not intended to limit the scope of fixation solution options but rather provide specific formulations that have been tested and shown to produce treated tissue components that can be successfully dried and will retain flexibility without cracking during bending.

In Fixation Solution Example A (as herein described) the fixation solution (75) is formed from an aqueous solution with a crosslinking solution penetrating agent (i.e., the penetrating agent used in the fixation solution (75) during the crosslinking step) at a concentration of 40% by weight (range 1-85%); the fixation solution penetrating agent (80) being polyethylene glycol. The crosslinking solution contains a concentration of crosslinking solution anions (i.e., anions used in the crosslinking solution during the crosslinking step) and crosslinking solution cations (i.e., cations used in the crosslinking solution); the anions and cations can be monovalent, divalent, or trivalent ions with a concentration of 10% by weight (range 1-20%). The crosslinking solution contains a crosslinking agent (85) of glutaraldehyde, formaldehyde, or other crosslinking agent (85) at a concentration of 5% (range 0.1%-10%).

In Fixation Solution Example B the crosslinking solution penetrating agent is glycerol at a concentration of 50% by weight (range 1-95%). The crosslinking solution contains a concentration of crosslinking solution anions and crosslinking solution cations (monovalent, divalent, or trivalent ions) of 10% by weight (range 1-20%). The crosslinking solution contains a crosslinking agent (85) of glutaraldehyde, formaldehyde, or other crosslinking agent (85) at a concentration of 5% by weight (range 0.1%-10%).

In Fixation Solution Example C the crosslinking solution penetrating agent is polyethylene glycol at a concentration of 50% by weight (range 1-95%) and glycerol at a concentration of 50% by weight (range 1-95%). The crosslinking solution contains a concentration of crosslinking solution anions and crosslinking solution cations (monovalent, divalent, or trivalent ions) of 10% by weight (range 1-20%). The crosslinking solution contains a crosslinking agent (85) of glutaraldehyde, formaldehyde, or other crosslinking agent (85) at a concentration of 5% by weight (range 0.1%-10%).

It is understood that the crosslinking solution can be comprised of one or more penetrating agent molecules and can contain one or more crosslinking agent molecules (85). Also, it is understood that separate penetrating agent molecules can be used in separate pretreatment steps (5) to form the pretreatment (5) of the tissue component (20). Also, it is understood that separate crosslinking agent molecules can be used in separate crosslinking steps to form the crosslinking of the tissue component (20). For example, one could apply a fixation step (10) utilizing Fixation Solution Example A followed by fixation (10) using the fixation formulation found in Fixation Solution Example B to form a combination crosslinking step to crosslink the tissue component (20).

Figure 4:
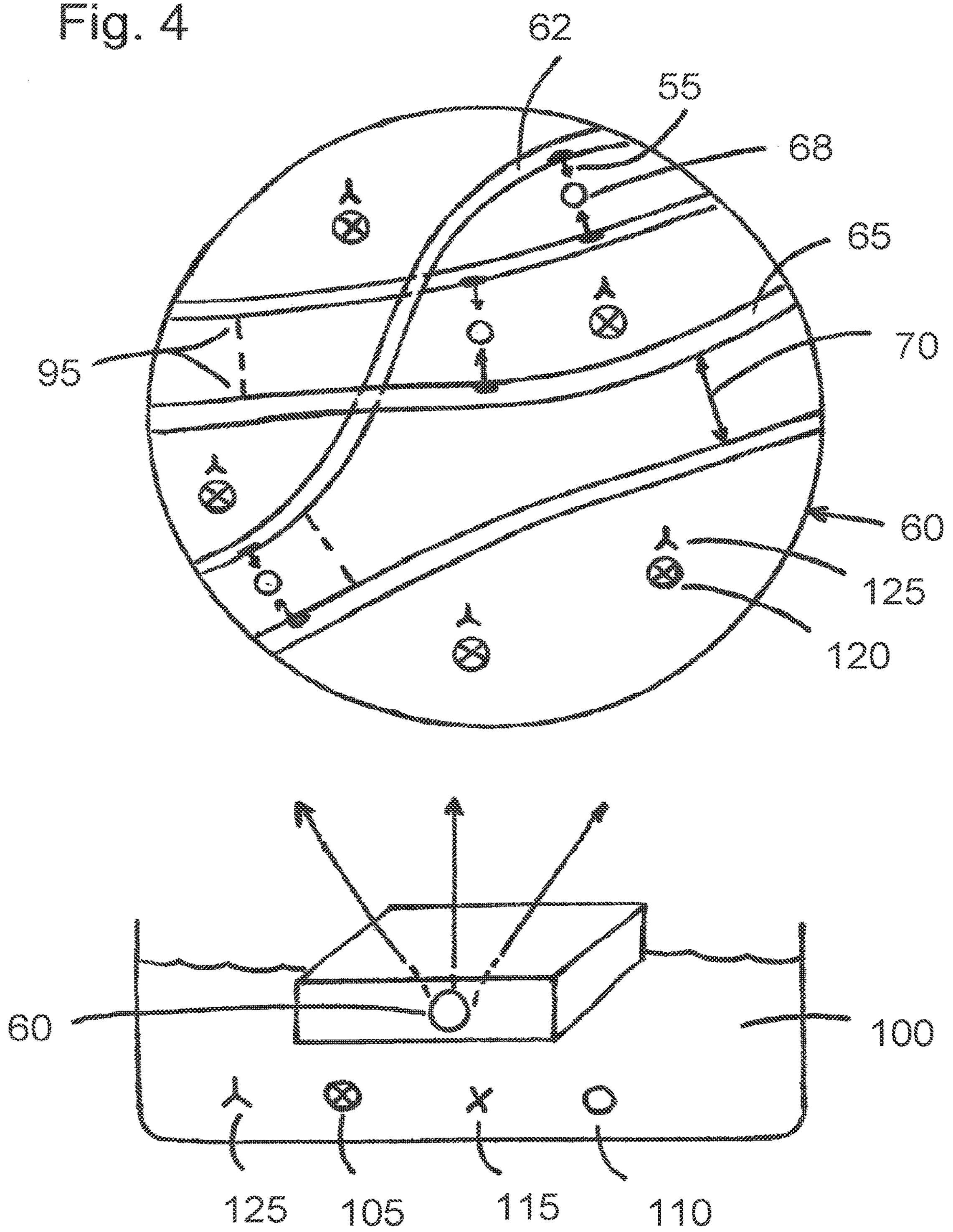
FIG. 4 is a view of the tissue component placed within the drying solution and a close up of the molecular structure of the tissue component showing interaction of the hygroscopic agent molecule with water molecules of the drying solution.

Prior to forming the drying step (15) the tissue component (20) is removed from the crosslinking solution; the drying step (15) is initiated by placing the tissue component (20) into an aqueous drying solution (100) containing hygroscopic agent molecules (105), drying solution counterions (110) (i.e., cations and anions used during the drying step), and drying solution penetrating agent molecules (115) as shown in FIG. 4. The drying solution penetrating agent molecules (115) include molecules with a flexible backbone chain (45) and at least one polar group attached to the backbone chain including, for example, the penetrating agent molecules described previously. The drying solution hygroscopic agent molecules (105) include isopropyl alcohol, ethanol, propanol, acetone, other polyhydric alcohol, or other molecules currently used in the medical device industry to absorb water. The hygroscopic agent molecules (105) provide one or more functional groups that are able to bond to water molecules (125) found within the interstices of the molecular structure (60) of the tissue component (20); the hygroscopic molecules along with the water found in the tissue component (20) is later removed as the tissue component is air dried or lyophilization dried as describe later.

As shown in FIG. 4 the presence of drying solution counterions (110) in the drying solution (100) (i.e., cations and anions previously identified but herein used in the drying solution (100)) assist in providing attractive forces (55) that enhance the penetration of hygroscopic agent molecules (120) and penetrating agent molecules (62) within the molecular structure (60) of the tissue component (20). The cations and anions can convert polar carboxyl group found on protein molecules of the tissue component into a salt that is water-soluble and hence provide improved integration of the hygroscopic agent molecule (120) and penetrating agent molecule (62) into the molecular structure (60) of the tissue component. The drying solution counterions (110) and drying solution penetrating agent molecules (115) are found at a concentration in the drying solution (100) that will prevent the diffusion of counterions (68) from the molecular structure (60) of the tissue component out of the tissue component and prevent diffusion of penetrating agent molecules (62) from the molecular structure (60) of the tissue component out of the tissue component and toward the drying solution (100). The intermolecular distance between respective neighboring structural molecules (65) has been increased due to the infiltration and bonding of penetrating agent molecules (62) located between adjacent structural molecules (65) due to presence of the attractive forces (55) provided by the counterions (68) (i.e., cations and anions). The presence of flexible penetrating agent molecules (62) within the molecular structure (60) of the tissue component (20) provides the tissue component with a greater flexibility and resistance to cracking during bending.

The tissue component is placed into the drying solution (100) for a period of 7 days (range 30 minutes-14 days) to allow the drying solution hygroscopic agent (105) and penetrating agent molecules (62) to penetrate into the molecular structure (60) of the tissue component and become a hygroscopic agent (120) associated with the tissue component. The intermolecular distance between structural molecules (65) such as collagen molecules, for example, found in the tissue component is increased from the intermolecular distance (70) between structural molecules (65) found in the native state of the tissue component. The presence of the flexible penetrating agent molecule (62) located between separate collagen molecules, for example, and held by ionic attractive forces (55) and covalent bond associated with the crosslinking bond (95) between structural molecules (65), for example, and penetrating agent molecules (62) provides a flexibility to the tissue component that will remain in place even after the tissue component has been completely dried via removal of water molecules (125) from the tissue component via air drying or lyophilization drying (via freeze drying with a vacuum) as described later. The intermolecular distance (70) between neighboring structural molecules (65) of the tissue component while present in the drying solution (100) are retained at an intermolecular distance (70) similar to that found in the crosslinked tissue component.

For the drying solution (100) the lower limit for concentration for the drying solution penetrating agent is 100 millimolar (mM) to prevent migration of penetrating agent molecules (62) out of the tissue component (20) and toward the drying solution (100). The lower limit for concentration of the drying solution counterions (110) of 300 mM is required to prevent diffusion of counterions (68) from the molecular structure (60) of the tissue component (20) toward the drying solution (100). The molar ratio of drying solution counterions (110) to drying solution penetrating agent in the drying solution (100) is 3:1, for example, although this molar ratio can be varied and still fit within the present invention.

The drying solution (100) of the present invention can utilize one or more penetrating agents with a range of concentrations by weight of 1 to 85 percent. Also, the drying solution (100) can incorporate one or more counterions with a concentration of 1-20 percent by weight. The drying solution (100) further contains a drying solution hygroscopic agent (105) at a concentration by weight of 10 to 100 percent. Examples of drying solution formulations that are included in the present invention are herein discussed; the drying solution examples are not intended to limit the scope of drying solution options but rather provide specific formulations that have been tested and shown to produce treated tissue components that can be successfully dried and will retain flexibility without cracking during bending.

In Drying Solution Example A (as herein described) the drying solution (100) is formed from an aqueous solution with a drying solution penetrating agent (i.e., the penetrating agent used during the drying step (15)) at a concentration of 40% by weight (range 1-85%); the drying solution penetrating agent being polyethylene glycol. The drying solution (100) contains a concentration of drying solution anions (i.e., anions used during the drying step (15)) and drying solution cations (i.e., cations used during the drying step (15)); the anions and cations can be monovalent, divalent, or trivalent ions at a concentration of 10% by weight (range 1-20%). The drying solution (100) contains a hygroscopic agent of isopropyl alcohol or ethanol, or other hygroscopic agent at a concentration of 50% (range 10%-100%).

In Drying Solution Example B the drying solution penetrating agent is glycerol at a concentration of 50% by weight (range 1-95%). The drying solution (100) contains a concentration of drying solution anions and drying solution cations (monovalent, divalent, or trivalent ions) of 10% by weight (range 1-20%). The drying solution (100) contains a drying solution hygroscopic agent (105) of isopropyl alcohol, ethanol, or other hygroscopic agent at a concentration of 50% (range 10%-100%).

In Drying Solution Example C the drying solution penetrating agent is polyethylene glycol at a concentration of 50% by weight (range 1-95%) and glycerol at a concentration of 50% by weight (range 1-95%). The drying solution (100) contains a concentration of drying solution anions and drying solution cations (monovalent, divalent, or trivalent ions) of 10% (range 1-20%).

It is understood that the drying solution (100) can be comprised of one or more penetrating agent molecules and can contain one or more drying solution hygroscopic agent molecules (105). Also, it is understood that separate penetrating agent molecules can be used in separate drying steps to form the drying of the tissue component (20). Also, it is understood that separate hygroscopic agent molecules can be used in separate drying steps to form the drying of the tissue component (20). For example, one could apply a drying step (15) involving Drying Solution Example A followed by a drying step (15) incorporating the drying solution (100) of Drying Solution Example B to form a combination drying step to dry the tissue component (20).

To complete the drying step (15), the tissue component (20) is removed from the drying solution (100) and placed on a flat surface to air dry or the tissue component (20) can be exposed to a lyophilization process to complete the drying step (15) and removal of water from the tissue component (20). The hygroscopic agent molecule has functional groups that are able to bond with water molecules (125) found within the tissue component (20). Air drying or lyophilization drying of the tissue component (20) will allow the hygroscopic agent molecule (120) along with the water molecules (125) to be evaporatively removed, for example, from the molecular structure (60) of the tissue component forming a dry tissue component (130) seen in FIG. 5; the dry tissue component (130) has a majority ??? (50-90%) of water molecules (125) removed from the molecular structure (60) of the dry tissue component (130) along with the hygroscopic agent (120). The intermolecular distance (70) between structural molecules (65) of the dry tissue component (130) in a fully dried state is reduced from the intermolecular distance (70) found with the tissue component positioned within the drying solution (100). The crosslink bonds of the penetrating agent molecules to the structural molecules (65) of the tissue component (20) retain the penetrating agent molecules (62) and counterions (68) within the molecular structure (60) of the tissue component (20) and provide enhanced flexibility to the tissue component (20) in a fully dried state without cracking due to bending of the tissue component (20).

The dry tissue component (130) (after substantially all the water or a majority of water has been removed) will retain the penetrating agent molecules (62) in a dry tissue component (130) and hence will retain a greater flexibility than with other processes that do not utilize counterions at a concentration required by the present invention (i.e., cations and anions) to enhance penetration and ionic bonding to hold penetration agent molecules adjacent to the structural molecules (65) such as a collagen molecule and adjacent to other native molecules of the tissue component (20) during the pretreatment (5), fixation (10), and drying steps (15) of the present invention. Retention of the penetration agent molecules at a concentration required by the present invention along with retention of lipid molecules within the molecular structure (60) of the tissue component (20) via crosslinking due to the crosslinking agent and due to ionic attractive forces (55) formed by the counterions (68) located within the molecular structure (60) will provide the dry tissue component (130) with flexibility during bending without crack formation due to brittleness of the tissue component (20) without the presence of the penetration agent molecules. Due to the presence of the counterions (68) within the molecular structure (60) of the dry tissue component (130), the dry tissue component (130) is able to rehydrate more rapidly by the physician in the operating room in comparison to other dry tissue components that do not contain counterions within the molecular structure (60) of the tissue component (20) at a concentration provided by the present invention.

Reference numerals used in the specification and found in any of FIGS. 1-5 of the present invention are intended to represent similar structures having similar functions. Also, it is understood that aspects of one or more embodiments can be combined with other aspect from another embodiment to form other embodiments that are also included in the present invention.

For example, an alternate embodiment of the present invention could apply an initial pretreatment-fixation step to the native tissue component that utilizes a pretreatment-fixation solution that has the penetrating agent molecules, the counterions, and the crosslinking agent molecules at a concentration that is the same as that of the fixation solution described earlier. The counterions and penetrating agent molecules found in the pretreatment-fixation solution would diffuse and integrate into the molecular structure of the native tissue component at the same time that the crosslinking agent molecules are forming crosslinking bonds to the penetrating agent molecules and to the structural molecules of the tissue component. In this embodiment the penetrating agent molecules and counterions would not have the opportunity to integrate as thoroughly into the molecular structure of the tissue component prior to forming crosslinking bonds as the case when separate pretreatment and fixation steps are utilized. The consistency of the molecular structure that has formed the crosslinking bonds would be more variable and dependent upon the timing for diffusion of counterions and penetrating agent molecules into the tissue component.

In yet a further embodiment the hygroscopic agent can be added to the pretreatment-fixation solution to form a pretreatment-fixation-drying solution. The native tissue component can be placed into a single pretreatment-fixation-drying solution that initially contains a small amount of hygroscopic agent and over a time period similar to that described for the fixation step, the hygroscopic agent concentration can be increased from a small concentration to a level that is the same as found in the drying step identified earlier. The tissue component can be removed from the solution and allowed to fully air dry or via lyophilization drying. This single step treatment for the tissue component is faster and easier than the three step process described in earlier embodiments of the present invention but does not provide the control over each step that can provide consistency to the properties of the tissue component including the flexibility of the dry tissue component and resistance to cracking from bending.

The invention claimed is:

1. A method of preparation of a tissue component suitable for implant in a body comprising three separate steps, each of said steps having a separate solution composition, said method comprising the following steps in order:

A. pretreating said tissue component in an aqueous pretreatment solution comprising one or more penetrating agents and counterions comprising both anions and cations, wherein the one or more penetrating agents and counterions are present at a concentration sufficient to diffuse into the tissue component; wherein the pretreatment solution comprises at least 100 mM of the penetrating agent and at least 300 mM of the counterions, B. crosslinking said tissue component in a fixation solution comprising one or more penetrating agents, counterions comprising both anions and cations, and a crosslinking agent, wherein the one or more penetrating agents and counterions are the same as those used in the aqueous pretreatment solution; wherein the crosslinking agent forms bonds with molecules contained within said tissue component, wherein the fixation solution comprises at least 100 mM of the penetrating agent and at least 300 mM of the counterions;

C. drying said tissue component in a drying solution comprising one or more penetrating agents, counterions comprising both anions and cations, and a hygroscopic agent; the hygroscopic agent being configured to absorb water molecules, wherein the drying solution comprises at least 100 mM of the penetrating agent and at least 300 mM of the counterions; and D. removing water molecules via air drying or lyophilization from said tissue component, wherein said method thereby forming a dry tissue component that does not crack upon bending.

2. The method of claim 1, wherein the tissue component, after the pretreatment step of step A, comprises penetrating agents and counterions from the pretreatment solution.

3. The method of claim 2, wherein the one or more penetrating agents and counterions in the fixation solution are present at a concentration sufficient to prevent the penetrating agents and counterions within the tissue component from diffusing out of said tissue component.

4. The method of claim 1, wherein said tissue component is placed from said pretreating step into said crosslinking step without rinsing said tissue component.

5. The method of claim 1, wherein the one or more penetrating agents are selected from a group consisting of polyethylene glycol, glycerol, fatty acids, vitamins, sugars, and polysaccharides.

6. The method of claim 1, wherein said crosslinking agent molecules are selected from a group consisting of glutaraldehyde, and formaldehyde.

7. The method of claim 1, wherein said hygroscopic agent is selected from a group consisting of isopropyl alcohol, ethanol, propanol, and acetone.

8. The method of claim 1, wherein said counterions are selected from a group consisting of sodium ions, calcium ions, ferrous ions, ferric ions, potassium ions, chloride ions, hydroxyl ions, sulfate ions, and phosphate ions.

9. A method of preparation of a tissue component comprising three separate steps, each of said steps having a separate composition, said method comprising:

A. pretreating said tissue component in an aqueous pretreatment solution comprising one or more penetrating agents and counterions comprising both anions and cations, wherein the one or more penetrating agents and counterions are present at a concentration sufficient to diffuse into the tissue component; wherein the pretreatment solution comprises at least 100 mM of the penetrating agent and at least 300 mM of the counterions, B. crosslinking said tissue component in a fixation solution comprising one or more penetrating agents, counterions comprising both anions and cations, and a crosslinking agent, wherein the one or more penetrating agents and counterions are the same as those used in the aqueous pretreatment solution; wherein the crosslinking agent forms bonds within said tissue component, wherein the fixation solution comprises at least 100 mM of the penetrating agent and at least 300 mM of the counterions, and C. drying said tissue component in a drying solution comprising one or more penetrating agents, counterions comprising both anions and cations, and a hygroscopic agent; the hydroscopic agent being able to absorb water molecules, wherein the drying solution comprises at least 100 mM of the penetrating agent and at least 300 mM of the counterions.

10. The method of claim 9 further comprising forming a dry tissue component that does not crack during bending by removing water from said tissue component in step C, by air drying or via lyophilization.

11. A method of preparation of a tissue component comprising:

A. pretreating said tissue component in an aqueous pretreatment solution comprising one or more penetrating agents and counterions comprising both anions and cations, wherein the one or more penetrating agents and counterions are at a concentration sufficient to diffuse into the tissue component, wherein the pretreatment solution comprises at least 100 mM of the penetrating agent and at least 300 mM of the counterions, B. removing said tissue component from said pretreatment solution and placing said tissue component into a fixation solution, said fixation solution comprised of crosslinking agent molecules, said penetrating agent molecules, and said counterions, wherein the fixation solution comprises at least 100 mM of the penetrating agent and at least 300 mM of the counterions, C. removing said tissue component from said fixation solution and placing said tissue component into a drying solution, said drying solution comprised of penetrating agents, counterions, and a hygroscopic agent able to absorb water molecules, wherein the drying solution comprises at least 100 mM of the penetrating agent and at least 300 mM of the counterions, D. drying said tissue component in the fixation solution, and E. removing the water molecules from said tissue component via air drying or lyophilization forming a dry tissue component that does not form cracks upon bending.

* * * * *